United States Patent [19]
Glodis et al.

[11] Patent Number: 6,105,396
[45] Date of Patent: Aug. 22, 2000

[54] METHOD OF MAKING A LARGE MCVD SINGLE MODE FIBER PREFORM BY VARYING INTERNAL PRESSURE TO CONTROL PREFORM STRAIGHTNESS

[75] Inventors: Paul Francis Glodis, Atlanta; Charles Francis Gridley, Suwanee; Donald Paul Jablonowski, Dunwoody; David Kalish, Roswell, all of Ga.; Kenneth Lee Walker, New Providence, N.J.

[73] Assignee: Lucent Technologies Inc., Murray Hill, N.J.

[21] Appl. No.: 09/115,783

[22] Filed: Jul. 14, 1998

[51] Int. Cl.[7] .................................................. C03B 37/027
[52] U.S. Cl. .............................. 65/377; 65/379; 65/412; 65/419; 65/420; 65/382
[58] Field of Search ............................ 65/412, 419, 420, 65/377, 379, 382, 484

[56] References Cited

U.S. PATENT DOCUMENTS

| | | | |
|---|---|---|---|
| 4,217,027 | 8/1980 | MacChesney et al. | 350/96.3 |
| 4,339,173 | 7/1982 | Aggarwal et al. | 350/96.3 |
| 4,477,273 | 10/1984 | Lynch et al. | 65/3.12 |
| 4,596,589 | 6/1986 | Perry . | |
| 4,632,684 | 12/1986 | Karbassiyoon | 65/379 |
| 4,816,050 | 3/1989 | Roba | 65/382 |
| 4,820,322 | 4/1989 | Baumgart et al. | 65/3.11 |
| 5,000,771 | 3/1991 | Fleming, Jr. et al. | 65/2 |
| 5,044,724 | 9/1991 | Glodis et al. | 385/127 |
| 5,106,402 | 4/1992 | Geittner et al. | 65/3.12 |
| 5,127,929 | 7/1992 | Gunther | 65/379 |
| 5,578,106 | 11/1996 | Fleming, Jr. et al. | 65/391 |
| 5,702,497 | 12/1997 | Oh . | |

FOREIGN PATENT DOCUMENTS

| | | |
|---|---|---|
| 0438876 | 7/1991 | European Pat. Off. . |
| 0887670 | 12/1998 | European Pat. Off. . |
| 57-92536 | 6/1982 | Japan ....................................... 65/412 |
| 63-256545 | 10/1988 | Japan ....................................... 65/412 |
| 4-270132 | 9/1992 | Japan ....................................... 65/412 |
| 2208114 | 3/1989 | United Kingdom . |
| 2293822 | 4/1996 | United Kingdom . |

OTHER PUBLICATIONS

P. F. Glodis, et al "The Application of Synthetic Silica Tubing for Large Preform Manufacture Using MCVD," International Wire & Cable Symposium Proceedings 1994, pp. 105–115.

Stewart Miller et al "Modified Chemical Vapor Deposition Process," *Optical Fiber Telecommunications II*, Academic Press, Inc., 1988, pp. 156–162.

*Primary Examiner*—John Hoffmann
*Attorney, Agent, or Firm*—Michael A. Morra

[57] ABSTRACT

A large optical preform 303 is made by a modified chemical vapor deposition (MCVD) process by depositing successive layers of core and cladding materials onto the inside surface of a rotating glass tube 33 having a hydroxyl ion ($OH^-$) level that is less than 0.5 parts per million (ppm) by weight. The tube is then collapsed inwardly to form a core rod 301 in which the deposited core material 31 has a diameter that is greater than about 5 millimeters and the deposited cladding material 32 has an outside diameter that is less than about 15 millimeters. A machine-vision system 140, 150, 160 monitors and controls the diameter of the glass tube by regulating the pressure within the tube. Moreover, the machine-vision system monitors and controls the straightness of the tube by varying its rotational speed according to angular position. After the core rod 301 is formed, it is plasma etched to remove contaminants, and then overclad with two glass jackets 34, 35 having a hydroxyl ion ($OH^-$) level that is less than 1.0 ppm by weight to create a large preform 303 from which about 400 kilometers of singlemode optical fiber can be drawn per meter of length.

10 Claims, 4 Drawing Sheets

METHOD OF MAKING A LARGE MCVD SINGLE MODE FIBER PREFORM BY VARYING INTERNAL PRESSURE TO CONTROL PREFORM STRAIGHTNESS

TECHNICAL FIELD

This invention generally relates to the manufacture of glass preforms using modified chemical vapor deposition (MCVD) and, more particularly, to a method for increasing the size of such MCVD preforms.

BACKGROUND OF THE INVENTION

In the manufacture of optical fiber, a glass preform is suspended vertically and moved into a furnace at a controlled rate. The preform softens in the furnace and a glass fiber is drawn freely from the molten end of the preform by a capstan located at the base of a draw tower. The present invention is concerned with the making of such a glass preform, which is a solid cylindrical rod having a refractive-index profile (i.e., the variation of the index of refraction as a function of distance from the center of the rod) that is suitable for guiding light. It is noted that the refractive-index profiles of the preform and the drawn fiber are substantially identical, even though the preform has a diameter that is thousands of times larger than that of the drawn fiber. The amount of fiber that can be drawn from a glass preform is directly proportional to the size of the preform. And there are significant cost savings attributable to the use larger preforms.

There are a number of competing processes for fabricating glass preforms, one of them being known as modified chemical vapor deposition (MCVD) in which the index of refraction of the preform is developed by depositing glassy particles (soot) on the inside walls of a glass tube (sometimes called a substrate tube). The soot comprises silica that is generally doped with germanium to increase its index of refraction. Other popular processes for making preforms include Outside Vapor Deposition (OVD) and Vapor Axial Deposition (VAD) in which soot is deposited on the outside surface of a soot boule that is sintered in a subsequent step.

There is perceived limitation on MCVD preform size that is due to the relatively low glass deposition rates and the relatively small amount of deposited glass possible in an inside deposition process. During the MCVD process, soot is simultaneously deposited and sintered into glass on the inside surface of the substrate tube. An MCVD heat source is typically a reciprocating oxygen-hydrogen torch that heats the outside surface of the substrate tube. Each pass of the torch adds a thin layer of glass onto the inside surface of the tube. Multiple thin layers of cladding material are deposited first, and then multiple thin layers of core material are deposited. In the simplest singlemode designs (i.e., non-dispersion-shifted, matched-clad or depressed-clad fiber), the cladding is usually at one level, which may be achieved by fluorine and/or phosphorus doping and the core is at another (usually just germanium doping). In more complicated singlemode designs (i.e., dispersion shifted fiber), the refractive index can vary across both the cladding and the core. Differences are created by varying the concentration of the dopant material (e.g., germanium) that is used. Limitation on the heat transfer rate across the substrate tube wall and on the maximum amount of reactants that can be delivered down the tube and efficiently reacted in the hot zone restrict the deposition rates. Typical MCVD deposition rates are between 0.2 and 2.0 grams/minute—depending on the composition of the glass. The diameter of the deposited core is designated (d) and the diameter of the deposited cladding is designated (D). Ideally, only core material needs to be deposited on the inside wall of the substrate tube to create the desired refractive index profile. In this situation, the deposited cladding/core (D/d) ratio is 1.00. However, this places too severe a requirement on the purity of the substrate tube. Presently, preforms made by MCVD yield up to 250 kilometers (km) of fiber per meter of preform length. By way of contrast, the deposition rate for the OVD and VAD processes range between 5 and 50 grams/minute, and preforms made by OVD and VAD yield more than 400 km of fiber per meter of preform length.

Nevertheless, MCVD has certain advantages relative to the above-mentioned outside deposition processes. Since soot deposition and sintering occur simultaneously in MCVD, dopants can be incorporated into the glass and fixed in place on a layer by layer basis. Moreover, the range of dopants that can be used in MCVD is larger than that of the outside processes. In addition to those dopants common to all processes, such as germanium, which raise the index of refraction, fluorine doping can be used in MCVD to significantly lower the index of refraction. Fluorine doping is difficult to manage in outside processes because the incorporation in soot is basically a diffusion process. The versatility of MCVD with respect to dopant choices allows the straightforward construction of complex index profile shapes. Another advantage of MCVD, which partially offsets the deposition rate disadvantage, is the use of the substrate tube and subsequent overclad tube to provide the bulk of the glass in the overall fiber manufacturing process.

In the MCVD process, dimensional instabilities and the formation of bubbles are created in a substrate tube that is exposed to extremely high temperatures for long periods of time, as would be the case in the manufacture of large MCVD preforms because large amounts of core material need to be deposited within the substrate tube. If one could merely increase the deposition rate of core material, as is done in MCVD preforms for multimode fiber where the deposition rate exceeds one gram per minute, then this concern would disappear. However, unlike multimode fiber which uses high levels of $GeO_2$ doping material, singlemode fiber uses relatively low levels of $GeO_2$. This difference is important because higher levels of dopant tend to decrease the softening point temperature (viscosity) of the deposited materials so that they form a smooth layer on the inside wall of the substrate tube at lower temperature. Accordingly, sintering can be accomplished at lower temperatures. Additionally, multimode fiber preforms further include $P_2O_5$ as a doping material, which further decreases the softening point temperature of the deposited materials (see, for example, U.S. Pat. No. 4,339,173).

Accordingly, what is sought is an MCVD preform for singlemode fiber that yields about 400 km, or more, of fiber per meter of preform length, and a commercially attractive process for making same.

SUMMARY OF THE INVENTION

A large optical preform is made via a modified chemical vapor deposition (MCVD) process by depositing successive layers of core and cladding materials onto the inside surface of a rotating substrate glass tube having a hydroxyl ion ($OH^-$) level that is less than 0.5 parts per million (ppm) by weight. The substrate tube is then collapsed inwardly to form a core rod in which the deposited core material has a diameter (d) that is greater than about 5 millimeters and the deposited cladding material has an outside diameter (D) that is less than about 15 millimeters. The core rod then jacketed with one or more layers of glass having a hydroxyl ion (OH⁻) level that is less than 1.0 ppm by weight to create the large preform from which about 400 kilometers of singlemode optical fiber can be drawn per meter of preform length.

In a preferred embodiment of the invention, two glass jackets (inner and outer) are used. Illustratively, the inner glass jacket may be down-doped while the outer glass jacket is not, and the resulting preform is used in making depressed-clad fiber.

Also in preferred embodiments of the invention, an oxygen-hydrogen torch is used during the deposit of core/cladding materials and also during the collapse of the substrate tube. Such a torch produces hydroxyl ion (OH⁻) contaminants on the surface of the core rod which are subsequently removed by plasma etching.

Preferably, a machine-vision system is used to control the physical dimensions of the substrate tube during the depositing of core and cladding materials, and during its collapse. The machine-vision system monitors and controls the diameter of the substrate tube by regulating the pressure within the tube. Moreover, the machine-vision system monitors and controls the straightness of the tube by causing the rotational speed of the tube to be a function of its angular position.

Larger preforms provide economic benefits to fiber manufacture. In preform fabrication, larger preforms increase the amount of fiber manufactured per unit time for the same complement of machinery an labor, Increased demand can be met without additional capital or labor. In fiber draw, larger preforms increase effective draw speed and draw yield by making the setup time a smaller percentage of the draw cycle time and startup losses a smaller percentage of the total preform length. In both perform and draw operations, set costs of labor and load are spread over a larger fiber output resulting in lower fiber cost per meter.

The inventors recognized that a commercially attractive tradeoff could be made between the optical purity of the substrate tube and the amount of cladding material that needs to be deposited. (As the purity of the substrate tube increases, the need for deposited cladding material decreases.) Additionally, the inventors recognized that MCVD cycle time needs to be low enough so that bulk OH levels in the substrate tube and the MCVD-deposited materials are not raised (by exposure to OH or H originating from the $H_2/O_2$ torch flame) beyond the point at which low loss fiber can be made with a low D/d ratio. The time previously spent depositing cladding material can now be spent depositing additional core material, which keeps cycle time low and allows the core rod to be installed in a thicker glass jacket. Accordingly, a commercially attractive method for making large MCVD preforms (i.e., large enough to draw about 400 km of optical fiber per meter of preform length) has been invented.

BRIEF DESCRIPTION OF THE DRAWING

The invention and its mode of operation will be more clearly understood from the following detailed description when read with the appended drawing in which.

DETAILED DESCRIPTION

Figure 2:
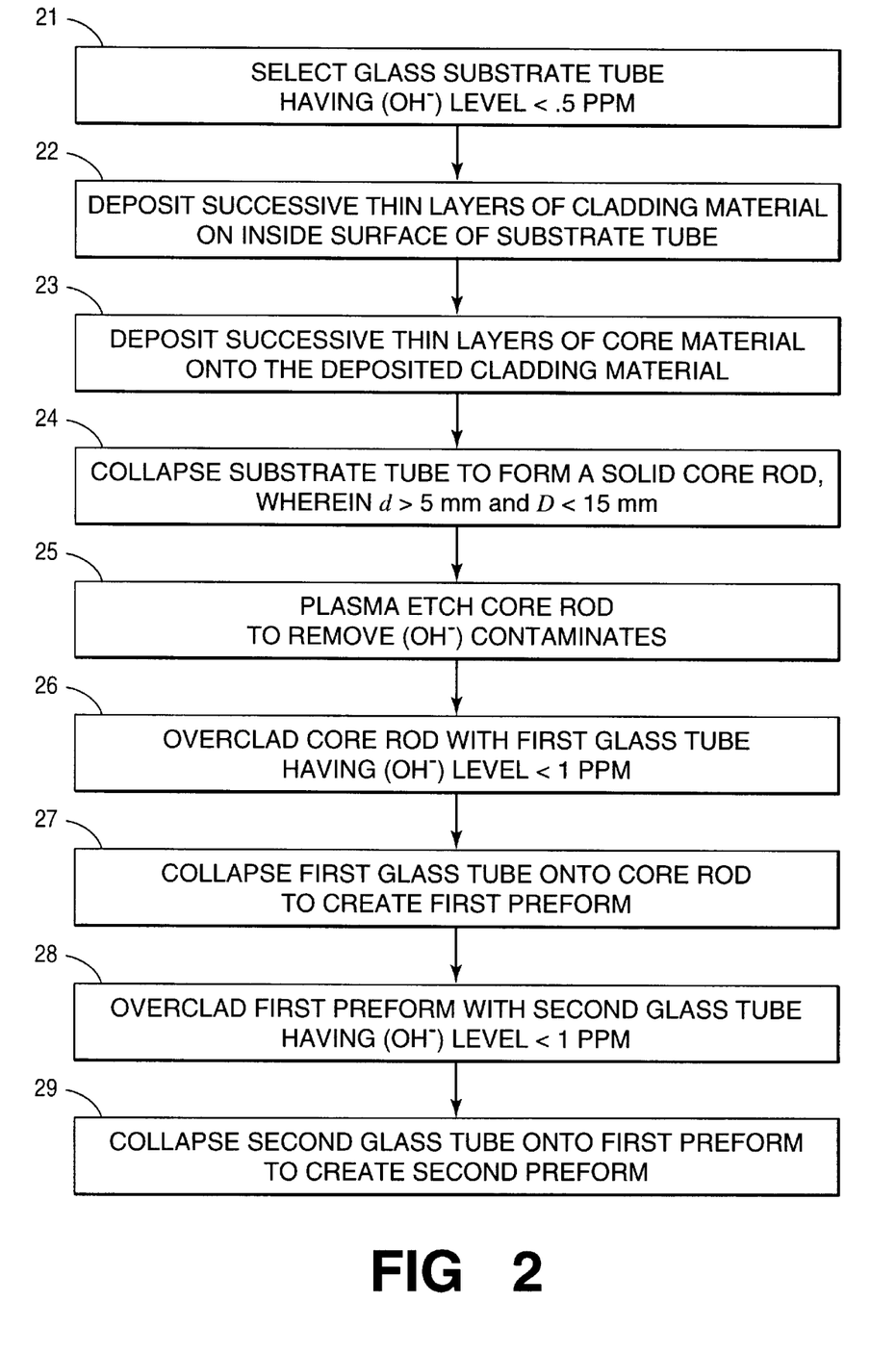
FIG. 2 is a flow-chart diagram of a method for making a large MCVD preform in accordance with the invention.

Reference is initially made to FIG. 2 which provides a general overview of the preferred method for fabricating a large preform in accordance with the present invention. These steps have individual numerals (21–29) which will be referred to throughout this specification.

For reasons of manufacturing efficiency in a modified chemical vapor deposition (MCVD) process, it is desirable to spend more time depositing core material and less time depositing cladding material. However, as the thickness of the deposited cladding is decreased, the need for purity in the overcladding tube becomes greater because impurities such as hydroxyl ions (OH⁻) in the substrate tube 33 cause absorption loss. This is because OH⁻ ions are mobile and will migrate toward the core, particularly during the fiber draw operation. And, even worse, OH ions can decompose into hydrogen, which is much more mobile than OH⁻ itself, and can also diffuse into the fiber core during fiber draw. Subsequent reaction between the hydrogen and atomic defects in the fiber core will cause OH⁻ ions to form there. It has been found that substrate tubes having an OH⁻ level that is less than 0.5 parts per million (ppm) are suitable for use in the present invention. And because a small amount of optical power propagates in substrate tube itself in conventional singlemode optical fiber, depending on the thickness of the deposited cladding, the substrate tube OH⁻ level sets a lower bound on the deposited cladding thickness for a suitably low loss fiber. Accordingly, step 21 calls for a selection of a substrate tube having such purity. Steps 22–24 relate to the fabrication of a core rod by a modified chemical vapor deposition process as discussed below:

Modified Chemical Vapor Deposition

Figure 1:
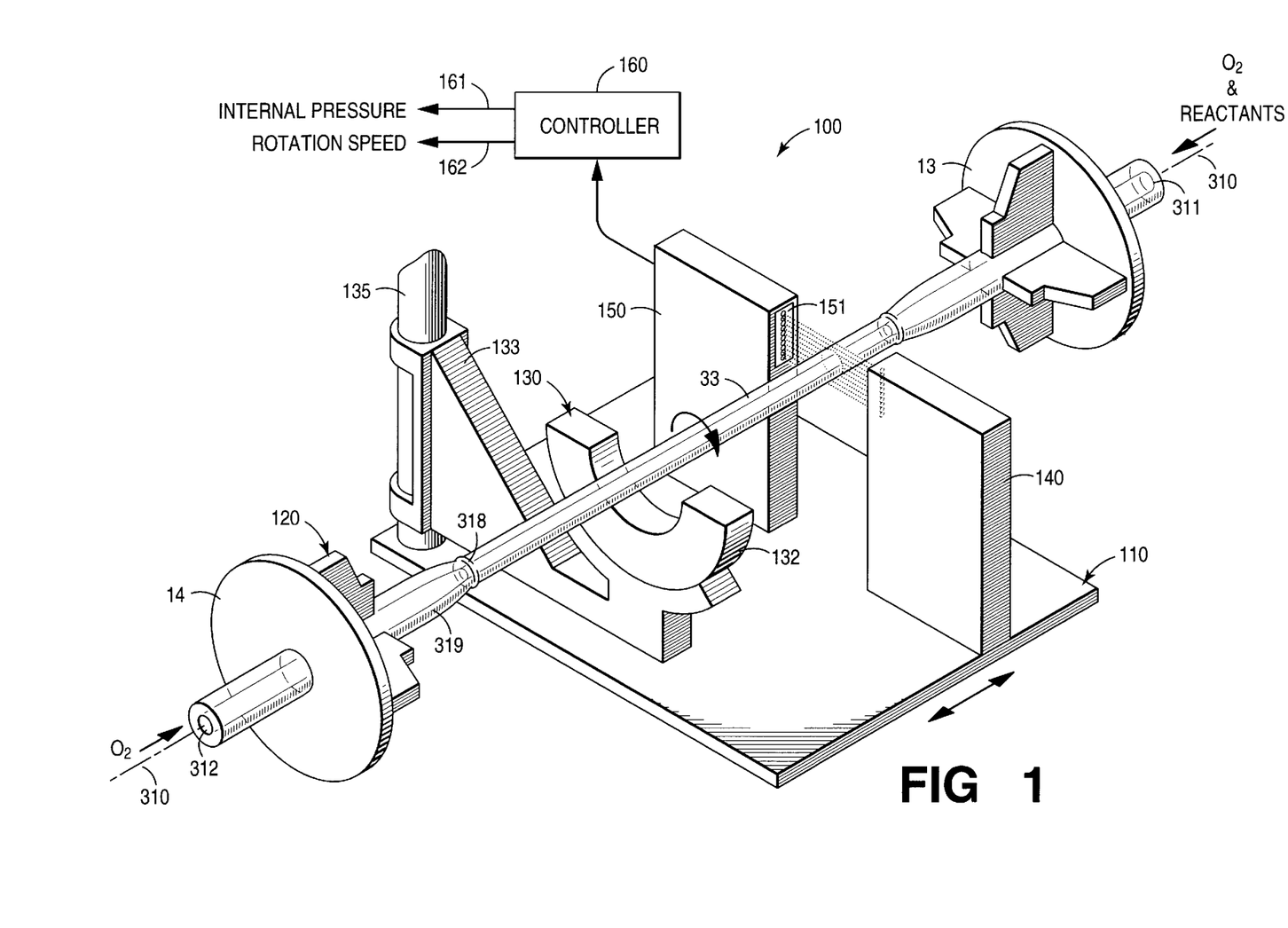
FIG. 1 is a perspective view of a glass-working lathe that includes a torch assembly for heating a glass substrate tube, and a machine-vision system for straightening the glass tube after it has been heated.

Reference is made to FIG. 1 which shows an apparatus, designated generally by the numeral 100, for heating a glass substrate tube 33 to manufacture a core rod by the MCVD process. Specific details of the MCVD process are disclosed in U.S. Pat. No. 4,217,027 and in chapter 4 (particularly pages 156–162) of the textbook *Optical Fiber Telecommunications II*, Academic Press, Inc., © 1988 AT&T and Bell Communications Research, Inc.—both of which are hereby incorporated by reference.

The apparatus 100 includes a glass-working lathe 120 having a headstock 13 and a tailstock 14, which are each driven off a common shaft (not shown), and which are used to support the glass substrate tube 33 in such a manner that it can be rotated. A rotation speed of about thirty (30) revolutions per minute is contemplated. The substrate glass tube 33 is positioned in the lathe with one of its ends in the headstock 13 and with its other end connected by a welded joint 318 to an exhaust tube 319. The exhaust tube 319 is supported in the tailstock 14 of the lathe 120. In the MCVD process, a constantly moving stream of reactants (e.g., silicon tetrachloride) and oxygen is directed through the interior of the substrate tube 33. This stream includes dopants such as germanium to produce the desired index of refraction in the finished lightguide fiber. During each pass, doped reactants are moved into the tube from its headstock end while spent gases are exhausted at the tailstock end.

The lathe 120 also includes a carriage 110, which is mounted for reciprocal motion along the lathe. Mounted on the carriage 110 is a torch assembly which is designated generally by the numeral 130. The torch assembly 130 includes a housing 132 supported by a bracket 133 which, in turn, is supported from a post 135 that is mounted on carriage 110. The torch assembly 110 is adapted to cause a flow of combustible gasses to produce flames which are directed toward the tube 33. By confining the heat from the burning gases to a desired surface area of the tube, the torch assembly provides a reaction temperature (illustratively, 2000°–2200° C.) within a zone of heat. The mounting of the torch assembly 130 on the carriage 110 and its movement relative to the tube 33 causes the zone of heat to be moved along the length of the rotating tube. Through adjustment of the bracket 133, an operator my move the torch assembly 130 within any one of a range of distances from the tube 33 or to any one of a plurality of positions about and spaced from the tube.

The torch assembly 130 may be constructed to be either a surface-mix unit or a premix unit. In a surface-mix unit, each of the two combustible gasses is fed through the torch assembly 130 and are mixed together within a confinement provided between the torch assembly and the tube. On the other hand, in the premix unit, the combustible gasses are premixed prior to their flow through the torch assembly and into the vicinity of the confined tube 33. It is important that the housing 132 and its nozzles (not shown) are cooled in order to provide a clean gas which prevents oxidation and resulting flaking of the material of which the housing and the walls are made. A coolant, such a chilled water, for example, is fed into conduits within the housing in order to provide the necessary cooling. Details regarding the design of a suitable torch assembly are disclosed in co-pending application Ser. No. 09/092,380 entitled *Modified Chemical Vapor Deposition Using Independently Controlled Thermal Sources*, which was filed on Jun. 5, 1998 (Marszalek et al. 1-6-77-2-23) and is hereby incorporated by reference.

During the deposition process, the torch assembly 130 slowly traverses the length of the rotating tube 33 from the headstock end 13 of the lathe 120 toward its tailstock end 14 and then quickly returns to the headstock end. It is noted that reactant gasses are fed into an input port 311 at the headstock end and are exhausted from output port 312 at the tailstock end. However, in order to maintain a suitable amount of pressure within tube 33 to keep its diameter from enlarging or decreasing, oxygen is fed into the exhaust port 312, although the net flow of gasses through the tube is from the headstock end to the tailstock end. Each pass of the torch assembly causes a single layer of silicon dioxide and dopants to be fused onto the inner wall of the tube. The composition of the various layers is determined by the composition of the reactant gasses and may be varied to obtain a gradation in index of refraction to obtain a desired profile.

It is noted that the present invention requires the deposition of significantly more core material within a substrate tube than has ever been deposited before. A preferred technique for increasing the rate at which core material is deposited is disclosed in co-pending application Ser. No. 09/112,069 entitled *High Rate MCVC Method Of Making An Optical Fiber Preform*, which was filed on Jul. 8, 1998 (Glodis et al. 6-5-1-22) and is hereby incorporated by reference. Nevertheless, even though the rate of core material deposition is increased, the substrate tube 33 still spends considerably more time at elevated temperatures than ever before and, consequently, is more susceptible to inadvertent changes in its shape. For this reason, apparatus 100 includes a machine-vision system mounted on the carriage 110 for causing the substrate tube 33 to have a central longitudinal axis 310—310 which is a straight line, and for measuring and controlling the outside diameter of the substrate tube.

The machine-vision system comprises a source of laser light 140 and a detector 150 that are positioned on opposite sides of tube 33. Detector 150 includes a linear array of photo-diodes 151 that detect the shadow cast by the tube. Controller 160 responds to electrical signals from detector 150 to control the rotation speed of the tube and to control the gas pressure within the tube. The laser source 140 and the detector 150 are positioned to monitor that portion of the tube which has just been heated. Preferably, the source 140 and the detector 150 are positioned between the torch assembly 130 and the headstock 13 during deposition, and between the torch assembly 130 and the tailstock 14 during collapse. If the tube 33 is not perfectly straight, then its shadow will wobble up and down on the array of photodetectors 151. Controller 160 responds to such wobble by varying the rotation speed of the tube 33 according to its angular position. Output 162 provides an electrical signal for controlling rotation speed. As one might expect, rotation speed is slower when the angular position of the tube is such that it is bowed upward; and rotation speed is faster when the angular position of the tube is such that it is bowed downward. Accordingly, gravity is used to straighten the tube. This represents a substantial improvement over known techniques for straightening such tubes. (e.g., U.S. Pat. No. 4,477,273 discloses the use of a carbon roller that is positioned beneath the tube, about where the laser source 140 and detector 150 are now positioned. The carbon roller engages the bottom side of tube, as necessary, in order to keep it straight.) Detector 150 also monitors the diameter of tube 33. In the event that the diameter is smaller than desired, controller 160 responds on output 161 by increasing the pressure of oxygen flow into port 312. In the event that the diameter is larger than desired, controller 160 responds on output 161 by decreasing the pressure of oxygen flow into port 312. In either situation, the net flow of gasses through the tube 33 is still in the direction from the headstock 13 toward the tailstock 14.

Following the deposition of core and cladding materials and in accordance with step 24 (see FIG. 2), the substrate tube 33 is collapsed to form a solid core rod by heating it a higher temperature than during deposition. The wall of the tube 33 is pinched together adjacent to its tailstock end to prevent the entry of moisture and other contaminants into the tube while it is being collapsed. During collapse, the torch assembly 130 now moves from tailstock to headstock in a number of passes. At the end of each pass, the carriage 110 is returned rapidly to the tailstock to commence another cycle. Although the direction of travel of the torch assembly 130 in its operative condition during the collapse mode is preferably opposite to that in the deposition mode, it may be the same. In that event, the tube 33 is not pinched off completely at the tailstock end in order to allow for the removal of gases. Otherwise, an undesirable pressure build-up in the tube could occur.

The collapse procedure for singlemode preforms usually starts with a series of shrinking passes in the same direction as the deposition. The laser 140 and detector 150 are positioned to follow the torch assembly 130. When the bore of the tube 33 is sufficiently small, one or more etching passes are carried out to remove a small amount of material from the inside surface. This material has been depleted of germanium during the previous shrinking passes and, if incorporated into the final collapsed rod, would cause a center dip in the refractive index profile. $C_2F_6$ is the etching gas used along with $O_2$ and $Cl_2$, and the etching passes are again in the in the original deposition direction. (This etching step is one reason why one cannot simply close the tailstock end of the tube 33 after deposition and perform all the collapse passes from tail to head.) Several more shrinking passes may follow the etch passes. The tube 33 is the sealed at the tailstock end, the laser source 140 and detector 150 are then switched to the opposite side of the torch assembly 130, and the collapse is finished with one or more passes in the tail-to-head direction with the laser source 140 and detector 150 still following the torch assembly 130.

At this point it is noted that a cylinder whose length is 1 meter and whose diameter is 5.2 millimeters (mm) can, mathematically, be elongated to form a cylinder whose length is 400 kilometers (km) and whose diameter is 8.2 microns, which corresponds to the diameter of the light-carrying region of a singlemode fiber. Accordingly, a 1-meter preform having a deposited core diameter of about 5 mm can be used to draw about 400 km of optical fiber. It is further noted that the outside diameter of the deposited cladding material, in the collapsed rod, has an outside diameter which is less than 15 mm. What this means is that the thickness of the deposited cladding material is less than 5 mm in the collapsed rod. This thin layer of deposited cladding material, which has virtually no $OH^-$ content, serves as a buffer for the substrate tube whose $OH^-$ level may be as high as 0.5 ppm. Nevertheless, it is sufficient for the present invention, which comprises the first commercially suitable technique for making preforms using the MCVD process from which more than about 400 kilometers of optical fiber can be drawn per meter of preform length.

Prior to or during the first pass in the collapse mode, the laser source 140 and the detector 150 are moved to the opposite side of the torch assembly 130. This may be done manually or automatically. The laser 140 and detector 150 need to be positioned on the side of the torch assembly where the tube is softer and, thus, more susceptible to being shaped.

Core Rod Etching

Figures 3, 4:
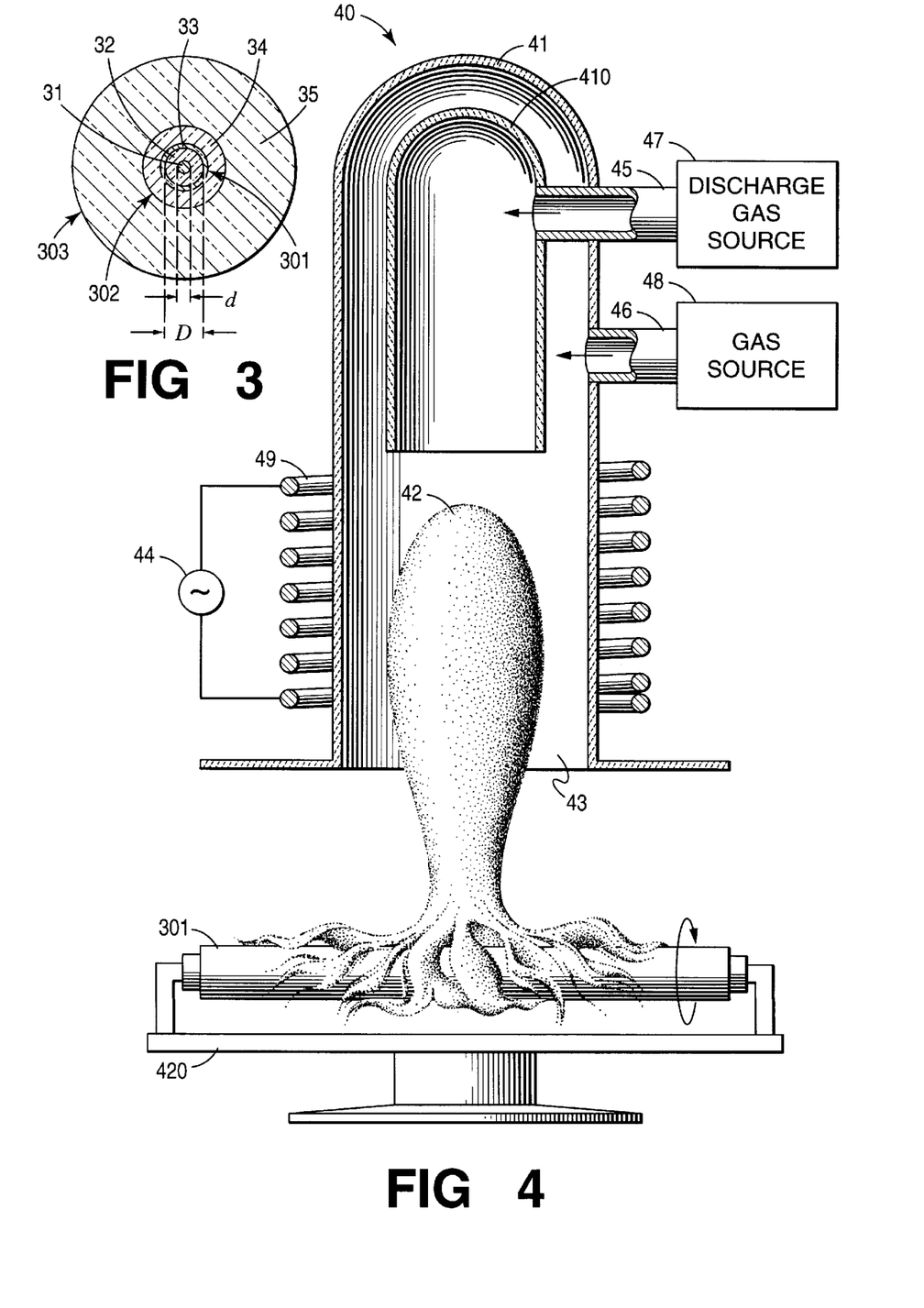
FIG. 3 shows the cross-section view of a glass preform according to the invention, illustrating the dimensions associated with its deposited core and cladding materials.
FIG. 4 shows a plasma torch removing hydroxyl ions (OH⁻) from the surface of a core rod.

Step numeral 25 indicates that the core rod is etched, preferably with a hydrogen-free plasma torch. FIG. 4 schematically shows apparatus for the plasma etching of core rod 20 to remove a substantial portion of the $OH^-$ ions that are present on the surface of the rod. Detailed information regarding plasma etching is available in U.S. Pat. No. 5,000,771, which issued on Mar. 19, 1991 and is hereby incorporated by reference. A brief discussion of the plasma etching process is given below, although it is understood that other etching techniques may be employed to effectively remove $OH^-$ ions from the rod's surface. These other etching techniques include, but are not limited to, mechanical grinding and chemical etching.

An isothermal plasma can be used for rapidly removing (etching) silica and silicate glass from the outer surface of a glass rod. With an isothermal plasma torch, the predominant mechanism for material removal is vaporization due to the high plasma temperature, which can typically attain levels greater than 9000° C. in the plasma center. Contact of the electrically conductive fireball with the refractory dielectric surface efficiently transfers energy to the surface, and raises the surface temperature above the vaporization point of the dielectric materials thereon.

FIG. 4 schematically depicts an exemplary apparatus for plasma etching. A torch 40 comprises a fused silica mantle 41 connected both to a gas source 48 by tube 46 and to a gas source 47 by tube 45. Gas source 47 delivers the desired gas used for the plasma discharge into the mantle 41 and through shield 410. The plasma fireball 42 is excited by an RF coil 49 and an RF generator 44. Gas sources are generally used to provide an ionizable gas, with the plasma fireball primarily contained in a confinement region of the torch. A substantial portion of the plasma fireball can be pushed out of the confinement region by adding, to the ionizable discharge gas, a high ionization threshold gas. The additional gas, supplied by gas source 48 and confined to the outer region of the torch by shield 410, creates an area in the upper portion of the confinement region where higher energy is needed to couple RF energy into the gasses to form a plasma. The portion of the fireball outside the torch is typically less than 50%, since maintaining a stable plasma generally requires the plasma center to remain in the torch for sufficient energy to couple into the plasma from the RF source. Additionally, operation with the fireball extended outside the torch by approximately 30% to 50% of its volume generally places greater requirements on the power requirements of the RF source and the flow rate of the gases involved with the process than operation below 30% of the fireball volume. By pushing the plasma center towards the torch exit, the plasma fireball can easily contact the core rod 301. Furthermore, contact is most readily made as the plasma fireball is pushed farther outside the torch.

The core rod 301 is mounted on a lathe 420 in such a way that the rod can be rotated. Generally, means for mounting and rotating such rods are known to those skilled in the art. Rotating the cylindrical core rod uniformly, with appropriate movement of the plasma torch along the rod, allow material to be removed from substantially the entire surface such that the core rod 301 retains its cross-sectional shape. More importantly, this particular etching technique allows removal of OH ions from the rod surface. In the preferred embodiment of the invention, an etch depth of 0.25±0.15 mm is selected. Accordingly, a core rod having a diameter of about 20 mm before plasma etching would have a diameter of about 19.5 mm after etching.

Gas flow rates into the plasma torch with either $O_2$ or $O_2$/Ar as the currently preferred gas, generally range from 1.0 to 100 liters/min. The plasma fireball, excited by an RF generator that typically provides output power between 20 and 40 kW at 3 MHz, for example, traverses the core rod at speeds typically from 0.01 to 100 cm/sec covering about 1 meter of the core rod being processed. Generally, the core rod is rotated between 0.1 and 200 rpm. These conditions can produce etch rates typically in the range from below 0.01 grams/min. to greater than 10 grams/min.

Overall fiber cost is reduced through the use of larger overcladding tubes. Preferably, the tube comprises synthetic silica, which is known for its high purity, low attenuation, and high tensile strength. The purity of the first overcladding tube 34 (see FIG. 3) will determine just how close to the core it can be placed. Step numeral 26 indicates that the core rod is overclad with a glass tube having an $OH^-$ level that is less than 1.0 ppm. In the preferred embodiment of the invention the approximate dimensions of the first overcladding tube 34 are: length=1 meter; O.D.=33 mm; and I.D.=20 mm.

Rod-in-Tube

Figure 5:
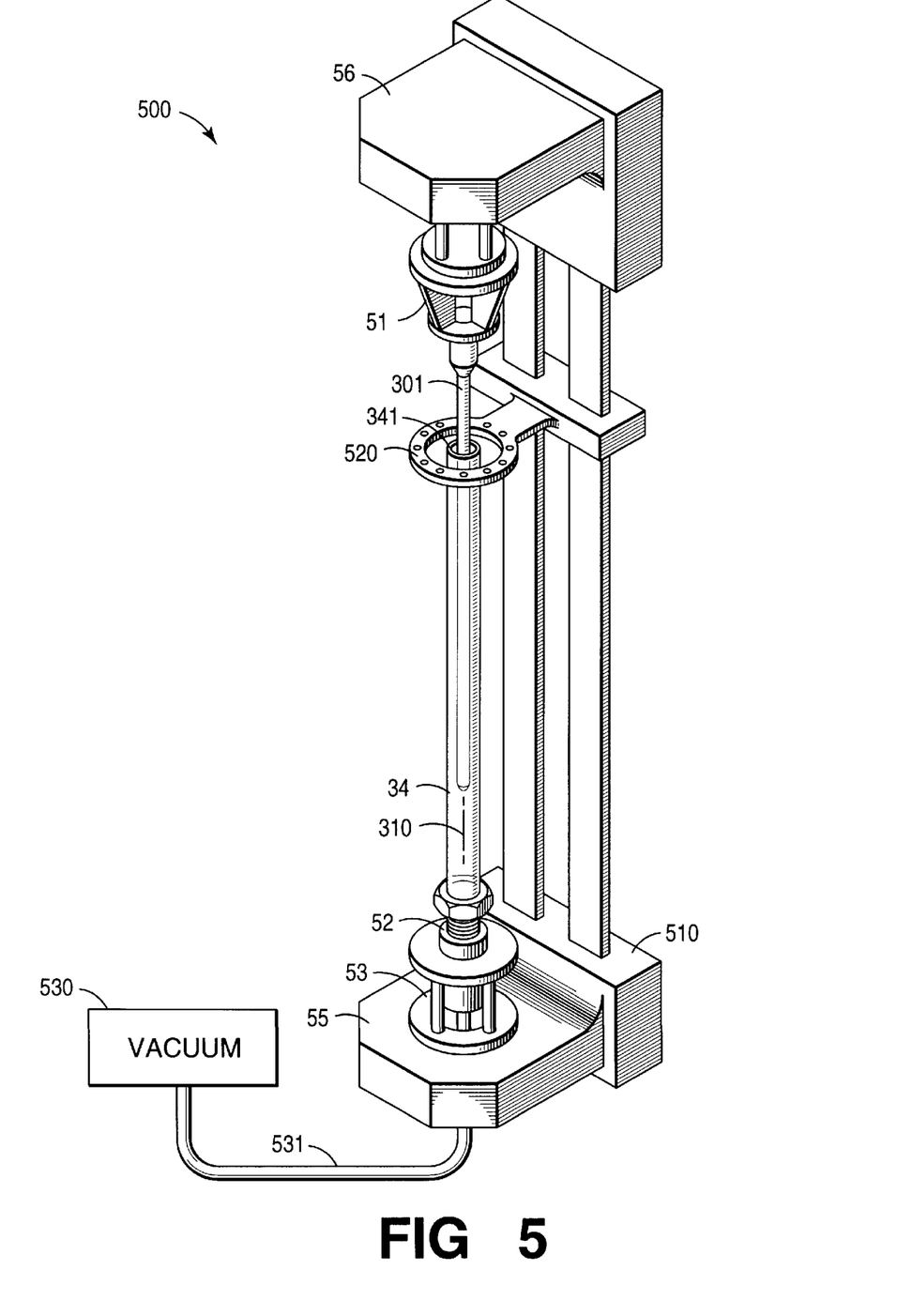
FIG. 5 is a perspective view of an apparatus for causing a core rod to be inserted into and aligned with a tube, and for causing the tube to be collapsed onto the rod.

Step 27 in FIG. 2 indicate that a first glass tube 34 is collapsed onto the core rod 301 to create a first preform 302, and step 29 indicates that a second glass tube 35 is collapsed onto the first preform 302 to create a second preform 303. In the preferred embodiment of the invention the approximate dimensions of the second overcladding tube 35 are: length=1 meter; O.D.=90 mm; and I.D.=33 mm. Reference is now made to FIG. 5 for a discussion of step 27 which is similar to step 29. Apparatus 500 is used to install core rod 301 into a hollow glass tube 34, and to collapse the tube onto the rod. As shown in FIG. 5, the glass tube 34 is mounted with a longitudinal axis 310 thereof extending vertically. Also, the tube 34 is mounted in a gimbal-type chuck 52 which is mounted in a holder 53 supported on a lower arm 55 of a vertical lathe frame 510, so that it is hinged and can be moved pivotally in any direction about its base. The lower chuck 52 also provides a seal with the outer surface of the tube 40. The rod 301 is suspended from an overhead chuck 51 and aligned with the tube. The chuck 51 is supported from an upper arm 56, which is cantilevered from the lathe frame 510. Afterwards, relative is established between the lower and upper lathe arms 55 and 56, respectively, and hence between the tube and the rod to cause a substantial portion of the length of the rod to become disposed within the tube.

The clearance at any point between the outer surface of the rod 301 and the inner surface of the tube 34 is controlled. For example, a rod having an outer diameter of 20 mm would be used with a tube having an inner diameter of 21.5 mm so that a uniform clearance of about 0.75 mm obtains. And although it is preferred that the rod be centered within the tube at the outset, this objective is not always achieved upon insertion, and the rod sometimes touches the tube prior to collapse or is not concentric therewith. Should there be a pre-collapse touching or non-concentric condition (eccentricity), the resulting overclad preform will have a center which is offset from the center of the rod. Nevertheless, in order to reduce such eccentricity, the tube can be moved, as appropriate, via the gimbal-type joint at the base of lathe frame 510 that permits pivotal movement in any direction.

A ring-type torch 520, which may be an oxygen-hydrogen torch, for example, circumscribes the entire periphery of the first overcladding tube 34. As the tube 34 and the core rod 301 are turned about their longitudinal axes, the torch 520 heats the tube 34 sufficiently to allow the tube to reposition itself and form an offset at the location of the dwell of the torch, thereby allowing the tube to become centered about the rod. In effect, the tube 34 is stress-relieved by heating it at a specific location and allowing it to align itself with the rod 301. For a predetermined dwell time, the torch 520 remains at or near the top end 341 of the tube, thereby causing it to become sealed to the rod 301 at this point. At this time, vacuum apparatus 530 having a tube 531 that extends through the arm 55 and holder 53 and which is connected to a lower end of the tube, causes the pressure within the tube to be lowered with respect to the pressure outside the tube. As a result, the sealing of the top end portion of the tube to the rod is accomplished with a vacuum assist. Illustratively, the pressure inside the tube is about 0.2 atmosphere. After the dwell time, the torch 520 is moved downward, traversing the length of the tube. A vacuum is maintained as the torch traverses the length of the tube 34, subjecting successive increments of length of the tube to a zone of heat and causing the tube 34 to be collapsed at a relatively rapid rate onto the rod 301 to create a preform whose cross section is shown in FIG. 3. For more details regarding this process, reference is made to U.S. Pat. No. 4,820,322 that issued on Apr. 11, 1989 and is hereby incorporated by reference. Alternatively, the glass tube can be collapsed onto the core rod using a plasma torch to further reduce OH$^-$ contamination as disclosed in U.S. Pat. No. 5,578,106 that issued on Nov. 26, 1996. It is generally not necessary to remove contaminants from the outer surface of the overclad tubes that are created during the overcladding process since they are sufficiently far from the core.

Reference is briefly made to FIG. 3 to illustrate the actual dimensions of a large preform in accordance with the present invention: 1 meter (length); 90 mm (outside diameter of second preform 303); 32 mm (outside diameter of first preform 302); 19.5 mm (outside diameter of core rod 301); 13 mm (outside diameter of the deposited cladding 32); and 7 mm (diameter of the deposited core 31). A preform having such dimensions is suitable for drawing about 520 km of singlemode optical fiber.

Although various particular embodiments have been shown and described, it is understood that modifications are possible within the scope of the invention.

What is claimed is:

1. A method for fabricating singlemode optical fiber comprising the steps:

selecting a first cylindrical tube which has length, a central axis, and is made from glass having a hydroxyl ion (OH$^-$) level which is less than 0.5 parts per million (ppm) by weight;

disposing the first cylindrical tube in a generally horizontal position, and rotating said tube about its central axis;

depositing successive layers of cladding material onto the inside surface of the first tube along its length;

depositing successive layers of core material onto the cladding material along its length;

monitoring the outside diameter of the first tube;

varying gas pressure within the first tube to control its outside diameter during the deposition of said core and cladding materials;

monitoring the straightness of the first tube;

varying the rate of rotation the first tube according to its angular position to control its straightness during the deposition of said core and cladding materials;

exposing the first tube to a heat source that moves along the length of the tube, wherein the heat from the source causes the tube to collapse inwardly to form a core rod, wherein the deposited core material has a diameter that is greater than about 5 millimeters and the deposited cladding material has a diameter that is less than about 15 millimeters;

selecting a second cylindrical tube having an inside diameter that is slightly larger than the outside diameter of the core rod;

placing a substantial portion of the core rod into the second tube; and exposing the second tube to a heat source that causes it to collapse inwardly upon the core rod to create a first preform.

2. The method of claim 1 further including the step of drawing the optical fiber from the first preform.

3. The method of claim 1 further including the steps:

selecting a third cylindrical tube having an inside diameter that is slightly larger than the outside diameter of the first preform, said tube being made from glass having a hydroxyl ion (OH$^-$) level that is less than 1.0 ppm by weight;

placing a substantial portion of the first preform into the third tube; and exposing the third tube to a heat source that causes it to collapse inwardly upon the first preform to create a second preform.

4. The method of claim 3 further including the step of drawing the optical fiber from the second preform.

5. The method of claim 3 wherein the second tube comprises down-doped glass and the third tube comprises undoped glass.

6. The method of claim 1 wherein the deposited core material includes germanium.

7. The method of claim 1 wherein the deposited cladding material includes fluorine.

8. The method of claim 1 further including the step:

removing a substantial portion of the surface contaminants on the core rod by removing a layer of material from the outside surface of the core rod to reduce its diameter by a predetermined amount.

9. The method of claim 8 wherein the step of removing a layer of material from the outside surface of the core rod is performed with a hydrogen-free plasma torch.

10. The method of claim 9 wherein a plasma torch is used to reduce the diameter of the core rod by 0.5±0.3 millimeters.

* * * * *